United States Patent
Maung et al.

(10) Patent No.: US 6,664,846 B1
(45) Date of Patent: Dec. 16, 2003

(54) CROSS COUPLED N-CHANNEL NEGATIVE PUMP

(75) Inventors: Min Maung, San Jose, CA (US); William B. "Brad" Vest, San Jose, CA (US); Myron W. Wong, Fremont, CA (US)

(73) Assignee: Altera Corporation, San Jose, CA (US)

( * ) Notice: Subject to any disclaimer, the term of this patent is extended or adjusted under 35 U.S.C. 154(b) by 57 days.

(21) Appl. No.: 09/942,434

(22) Filed: Aug. 29, 2001

Related U.S. Application Data
(60) Provisional application No. 60/228,990, filed on Aug. 30, 2000.

(51) Int. Cl.[7] .................................................. G05F 3/02
(52) U.S. Cl. ......................... 327/536; 327/537; 363/59
(58) Field of Search .............................. 327/534, 536, 327/537; 363/59

(56) References Cited

U.S. PATENT DOCUMENTS

| | | | | |
|---|---|---|---|---|
| 5,301,097 A | * | 4/1994 | McDaniel .................... 307/110 |
| 5,343,088 A | * | 8/1994 | Jeon ............................ 327/536 |
| 5,406,517 A | | 4/1995 | Chang et al. .......... 365/189.09 |
| 5,444,362 A | * | 8/1995 | Chung et al. ................ 327/536 |
| 5,644,534 A | * | 7/1997 | Soejima ....................... 365/149 |
| 5,973,979 A | | 10/1999 | Chang et al. ................ 365/226 |
| 6,107,864 A | * | 8/2000 | Fukushima et al. ......... 327/536 |
| 6,172,886 B1 | * | 1/2001 | Lauterbach et al. .......... 363/60 |
| 6,198,340 B1 | * | 3/2001 | Ting et al. ................... 327/536 |
| 6,278,315 B1 | * | 8/2001 | Kim ............................ 327/536 |
| 6,285,240 B1 | * | 9/2001 | Shiau et al. ................. 327/536 |
| 6,476,666 B1 | * | 11/2002 | Palusa et al. ................ 327/536 |

* cited by examiner

Primary Examiner—Terry D. Cunningham
(74) Attorney, Agent, or Firm—Morrison & Foerster LLP

(57) ABSTRACT

A charge pump circuit is described. The charge pump circuit includes: a first pumping stage, where the first pumping stage receives a first input voltage and a second input voltage and outputs a first output voltage and a second output voltage, and at least a second pumping stage coupled to the first pumping stage, where the second pumping stage receives the first output voltage and the second output voltage and outputs at least a third output voltage, further where the first output voltage and the second output voltage are output within one clock cycle.

29 Claims, 2 Drawing Sheets

CROSS COUPLED N-CHANNEL NEGATIVE PUMP

CROSS-REFERENCE TO RELATED APPLICATIONS

This application claims the benefit of U.S. Provisional Application Ser. No. 60/228,990, filed Aug. 30, 2000, and entitled "Cross Coupled N-channel Negative Pump".

BACKGROUND OF THE INVENTION

1. Field of the Invention

This invention relates generally to integrated circuits and, in particular, to pump circuits used in integrated circuits.

2. Description of the Related Art

In some integrated circuits, it is desirable to have a circuit that provides a high negative voltage. This is particularly true for integrated circuits that include memory devices, such as, for example, electrically erasable programmable read-only-memory (EEPROM) devices. The high negative voltage is applied to control gates of memory cells during erasure to erase the data stored in the memory cells.

An example of a pump circuit that provides a negative voltage is described in U.S. Pat. No. 5,973,979. Some N-channel negative charge pumps, such as that of U.S. Pat. No. 5,973,979, suffer from several disadvantages. First, in order to minimize the body-effect coefficient, these N-channel negative charge pumps use separate P-wells for different stages of the charge pump. The use of separate (and therefore multiple) P-wells increases the area of the charge pump circuit. Second, these negative charge pump circuits use a four phase clock for controlling the relevant gates of transistors in the charge pump circuit. Thus, they use a timing circuit of greater complexity than would be needed in a system whose clock has fewer phases. Third, these charge pump circuits include only one path for transferring charge from one stage to the next stage. As a consequence, they allow for only one charge transfer from one stage to the adjacent stage during a clock cycle.

As a result, there has been a need for charge pump circuit that addresses the shortcomings of existing charge pump circuits.

SUMMARY OF THE INVENTION

The present invention encompasses a charge pump circuit. In one embodiment, the charge pump circuit of the present invention includes: a first pumping stage, where the first pumping stage receives a first input voltage and a second input voltage and outputs a first output voltage and a second output voltage, and at least a second pumping stage coupled to the first pumping stage, where the second pumping stage receives the first output voltage and the second output voltage and outputs at least a third output voltage, further where the first output voltage and the second output voltage are output within one clock cycle.

In one embodiment, the first pumping stage receives the first input voltage and the second input voltage at a first path input of a first path and a second path input of a second path, respectively, where the first path and the second path include a first switch and a second switch, respectively, where the first switch is cross coupled to the second switch. In one embodiment, charge of one polarity is transferred to the second pumping stage via both the first and second paths in one clock cycle. In one embodiment, the first and second input voltages are clock signals whose period is equal to one clock cycle. In one embodiment, the first and second switches in each pumping stage are N-channel transistors and the N-channel transistors in each of the pumping stages of the charge pump circuit are biased by the output of the charge pump circuit.

The present invention is explained in more detail below with reference to the drawings.

DETAILED DESCRIPTION OF THE INVENTION

The present invention comprises an N-channel negative charge pump circuit that provides a relatively larger negative output voltage. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
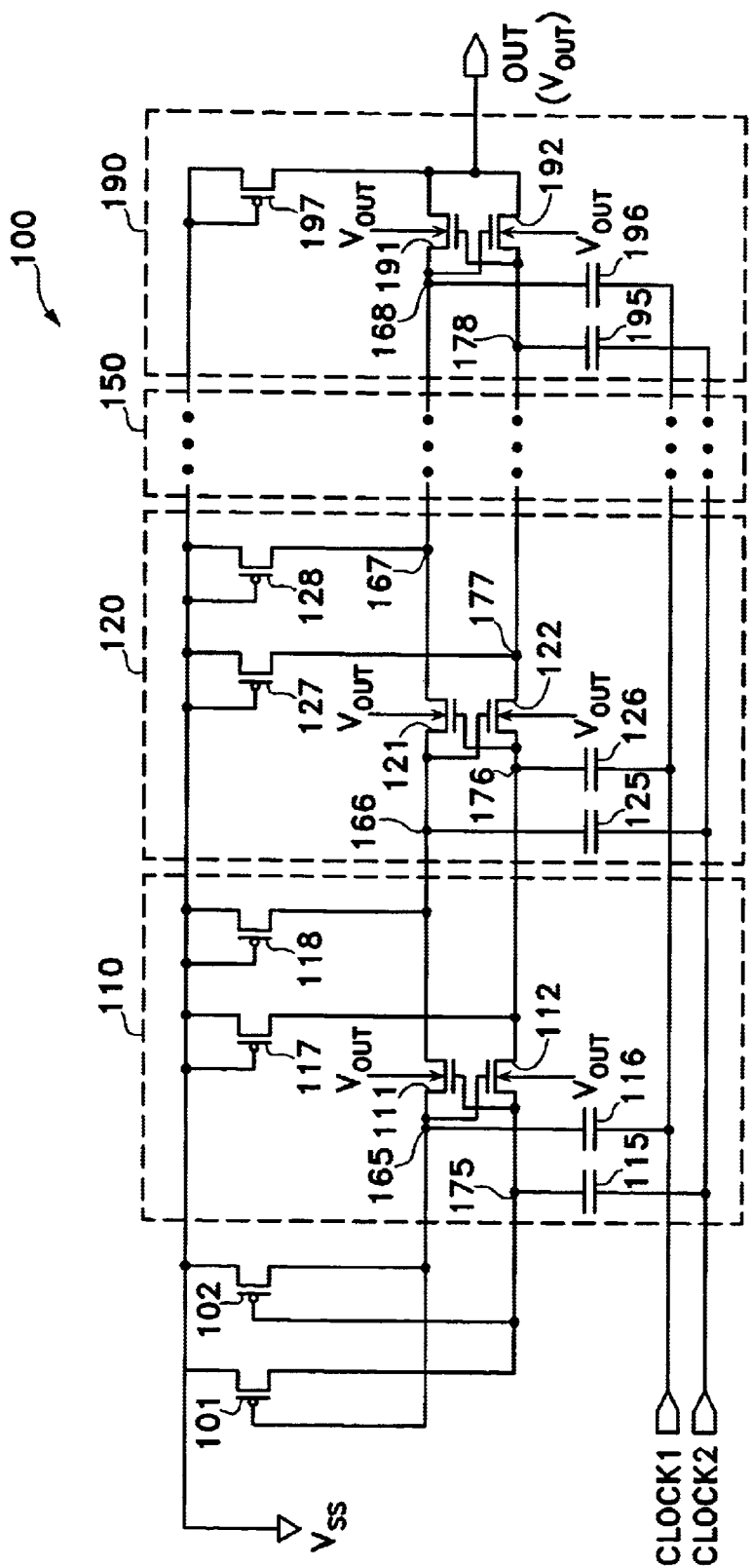
FIG. 1 is a circuit diagram of an N-channel charge pump circuit of the present invention.

FIG. 1 is a circuit diagram of an embodiment of the N-channel charge pump circuit of the present invention. In FIG. 1, N-channel charge pump circuit 100 includes a first pumping stage 110, a second pumping stage 120, and an X-th pumping stage 190, where X is an integer, and, in this specific case, X is an integer greater than 2. The X-th pumping stage 190 may also herein be referred to as the last pumping stage 190 or the output pumping stage 190. Not shown expressly in FIG. 1, but symbolized by ellipses 150 between the second pumping stage 120 and the X-th pumping stage 190 are any additional pumping stages that may exist between the second pumping stage 120 and the X-th pumping stage 190. For example, in one embodiment of the invention, there are ten pumping stages in the N-channel charge pump circuit 100. In that embodiment, X is equal to 10 and there are seven pumping stages (the third to ninth pumping stages) between the second pumping stage 120 and the X-th pumping stage 190. In addition to the pumping stages, the N-channel charge pump circuit 100 also includes leakage minimization transistors 101 and 102.

Inputs to the N-channel charge pump circuit 100 include CLOCK 1 and CLOCK 2 signals. In one embodiment, the clock signals CLOCK 1 and CLOCK 2 are power supply voltages that alternate between 0 and $V_{CC}$ volts. In one embodiment of the present invention, $V_{CC}$ is 1.8 volts. The present invention, however, is not limited to operating at a $V_{CC}$ of 1.8 volts, but may also work with higher and lower $V_{CC}$ voltages. Also in one embodiment, CLOCK 1 and CLOCK 2 are 180 degrees out of phase with respect to one another. Thus, when CLOCK 1 is high, CLOCK 2 is low and vice versa. Moreover, when CLOCK 1 transitions from a low (i.e., 0 volts) to a high (i.e., $V_{CC}$ volts) voltage, CLOCK 2 transitions from a high to a low voltage. The output OUT of the N-channel charge pump circuit 100 is the output of the X-th pumping stage 190.

As can be seen in FIG. 1, the first pumping stage 110 includes cross coupled transistors 111 and 112. The source of transistor 111 is coupled to the gate of transistor 112, while the source of transistor 112 is coupled to the gate of transistor 111. Additionally, the gate of transistor 111 is coupled to the CLOCK 2 signal through capacitor 115, while the gate of transistor 112 is coupled to the CLOCK 1 signal through capacitor 116. The first pumping stage 110 also includes initialization transistors 117 and 118 which are coupled to the drains of transistors 112 and 111, respectively.

The second pumping stage 120 is very similar to the first pumping stage 110. The main difference between the first and second pumping stages 110 and 120 is the coupling of the clock signals to the cross coupled transistors. In the first pumping stage 110, CLOCK 1 is coupled to the gate of transistor 112, which is part of the lower branch of the first pumping stage 110, while CLOCK 2 is coupled to the gate of transistor 111, which is part of the upper branch of the first pumping stage 110. On the other hand, in the second pumping stage 120, CLOCK 1 is coupled to the gate of transistor 121, which is part of the upper branch of the second pumping stage, while CLOCK 2 is coupled to the gate of transistor 122, which is part of the lower branch of the second pumping stage. This arrangement of the coupling of the clock signals to the gate signals of the cross coupled transistors is alternated at each stage until the X-th pumping stage 190.

The X-th pumping stage 190 is also similar to the first pumping stage 110. In FIG. 1, the coupling of the clock signals to the gates of the cross coupled transistors 191 and 192 are shown as being identical to those in the first pumping stage 110. This identity will exist assuming that there are zero or an even number of pumping stages between the second pumping stage 120 and the X-th pumping stage 190. Otherwise, the coupling of the clock signals to the gates of the cross coupled transistors 191 and 192 would be identical to those in the second pumping stage 120. Another difference between the X-th pumping stage and other pumping stages is that it has one initialization transistor 197 rather than two initialization transistors. In another embodiment, where the output is a differential output at two nodes, rather than one output at one node, there would be two initialization transistors in the X-th pumping stage 190, as in the other pumping stages. Another difference between the X-th pumping stage 190 and the previous pumping stages is that the output of the X-th pumping stage 190 is not coupled to the clock signals.

In the above description, the first pumping stage 110 is described as including capacitors 115 and 116. Similarly, the second pumping stage 120 is described as including capacitors 125 and 126, while the X-th pumping stage 190 is described as including capacitors 195 and 196. Alternatively, each pumping stage may be described as including the capacitors at the output of that stage. Thus, for example, the first pumping stage 110 may be described as including the capacitors 125 and 126. Similarly, the second pumping stage 120 may be described as including the capacitors 195 and 196 (if there are no stages between the second pumping stage 120 and the X-th pumping stage 190) or the capacitors that would otherwise be considered to be between the second and third pumping stages (if there are any stages between the second pumping stage 120 and the X-th pumping stage 190.)

Alternatively, the first pumping stage 110 may be said to include cross coupled transistors 111 and 112, but not the initialization transistors 117 and 118 or the capacitors before or after the cross coupled transistors 111 and 112. Similarly, the second pumping stage 120 may be said to include cross coupled transistors 121 and 122, but not the initialization transistors 127 and 128 or the capacitors before or after the cross coupled transistors 121 and 122. Finally, the X-th pumping stage 190 may be said to include cross coupled transistors 191 and 192, but not the initialization transistor 197 or the capacitors before or after the cross coupled transistors 191 and 192.

In one embodiment, the initialization transistors, such as initialization transistors 117 and 118 initialize the voltages at the drains of cross coupled transistors 111 and 112, i.e., at nodes 166 and 176, respectively. As can be seen in FIG. 1, the gate and source of each of initialization transistors 117 and 118 are coupled to one another. Moreover, the gate and source are coupled to $V_{SS}$, which is at ground voltage. Thus, the initialization transistors 117 and 118 initialize the voltage at the drain of cross coupled transistors 111 and 112 at one threshold voltage above ground. The initialization transistors in the other charging stages perform a similar function in their respective stages. In one embodiment, the initialization of the N-channel charge pump circuit 100 occurs prior to the application of input signals, i.e., the clock signals CLOCK 1 and CLOCK 2.

Leakage minimization transistors 101 and 102 are cross coupled to one another. In this case, the drain of transistor 101 is coupled to the gate of transistor 102, while the drain of transistor 102 is coupled to the gate of transistor 101. The sources of transistors 101 and 102 are coupled to $V_{SS}$. Finally, the drains of transistors 101 and 102 are coupled to the sources of transistors 112 and 111, respectively. In one embodiment, transistors 101 and 102 are P-channel transistors. Moreover, the N-wells of transistors 101 and 102 are biased by the power supply voltage, i.e., $V_{CC}$. As a result, transistors 101 and 102 can be turned off effectively. This allows minimizing leakage of current from the first pumping stage 110 to $V_{SS}$, i.e., ground. Additionally, since transistors 101 and 102 are cross coupled, they may also be considered as an initial pumping stage which transfers the voltage $V_{SS}$ to nodes 165 and 175.

In one embodiment, the leakage minimization transistors 101 and 102, as well as the initialization transistors 117, 118, 127, 128, and 197 are P-channel transistors. Moreover, the N-wells of these transistors are biased by the power supply voltage $V_{CC}$, i.e., the high voltage of the clock signal. Additionally, in one embodiment, these transistors are medium thick oxide transistors. It is to be noted that, in another embodiment, these transistors may be other than medium thick oxide transistors.

In one embodiment, the cross coupled transistors 111, 112, 121, 122, 191, and 192 of the main pumping stages, i.e., the first to the X-th pumping stages, are N-channel transistors. More specifically, they are triple well N-channel transistors. A triple well N-channel transistor is illustrated in U.S. Pat. No. 5,973,979, which is herein incorporated by reference. Additionally, in one embodiment, all of these cross coupled transistors are formed in the same P-well which in turn resides in an N-well biased by $V_{CC}$ and is biased by the output voltage, i.e., the voltage at the output terminal OUT. Moreover, in one embodiment, these cross coupled transistors are native, thick oxide transistors. In one embodiment, P-channel transistors 101, 102, 117, 118, 127, 128, and 197 and the N-channel transistors 111, 112, 121, 122, 191, and 192 reside in separate N-wells.

When the clock signal CLOCK 1 transitions from low (i.e., 0 volts) to high (i.e., $V_{CC}$ volts), the voltage at node 165 is driven high through capacitor 116. As node 165 is coupled to the gate of the leakage minimization transistor 101, when the voltage at node 165 is high, leakage minimization transistor 101 is turned off. In one embodiment, as clock signal CLOCK 1 transitions from low to high, clock signal CLOCK 2 transitions from high to low. Thus, the voltage on capacitor 115 is driven low, which in turn drives the voltage at node 175 low. With a low voltage at node 175, the leakage minimization transistor 102 is on. Thus, leakage minimization transistors 101 and 102 are off and on, respectively. Furthermore, the voltages at nodes 165 and 175 are high and low, respectively.

As noted above, when the clock signal CLOCK 1 transitions from low to high, the voltage on capacitor 116 is driven from low to high, which in turn drives the voltage at node 165 from low to high. A high voltage at node 165 causes transistor 112 to turn on. When transistor 112 is on, positive charge is passed from node 176 to node 175. The charge transfer between nodes 175 and 176 may alternatively be described as a negative charge transfer from node 175 to node 176. As a result of this charge transfer between nodes 175 and 176 (i.e., negative charge transfer from node 175 to node 176 or positive charge transfer from node 176 to node 175), the voltage level at node 176 is decreased while that at node 175 is increased.

In one embodiment, when the clock signal CLOCK 1 transitions from low to high, the clock signal CLOCK 2 transitions from high to low, and as a result, the voltage at node 175 is low. With a low voltage at node 175, transistor 111 is off since its gate is coupled to node 175. Thus, when CLOCK 1 is high and CLOCK 2 is low, transistor 111 is off and transistor 112 is on.

When the clock signal CLOCK 1 transitions from high to low, the voltage at node 165 goes from high to low. With a low voltage at node 165, transistor 101 is turned on. In one embodiment, when clock signal CLOCK 1 transitions from high to low, clock signal CLOCK 2 transitions from low to high, and the voltage at node 175 goes from low to high. With a high voltage at node 175, transistor 102 is turned off. Thus, leakage minimization transistors 101 and 102 are on and off, respectively. Furthermore, the voltages at nodes 165 and 175 are low and high, respectively.

As noted above, in one embodiment, when the clock signal CLOCK 1 transitions from high to low, clock signal CLOCK 2 transitions from low to high. With clock signal CLOCK 2 transitioning from low to high, the voltage on capacitor 115 is driven from low to high, which in turn drives the voltage at node 175 from low to high. A high voltage at node 175 causes transistor 111 to turn on. When transistor 111 is on, positive charge is passed from node 166 to node 165. The charge transfer between nodes 165 and 166 may alternatively be described as a negative charge transfer from node 165 to node 166. As a result of this charge transfer between nodes 165 and 166 (i.e., negative charge transfer from node 165 to node 166 or positive charge transfer from node 166 to node 165), the voltage level at node 166 is decreased while that at node 165 is increased.

In one embodiment, when the clock signal CLOCK 2 transitions from low to high, the clock signal CLOCK 1 transitions from high to low, and as a result, the voltage at node 165 is low. With a low voltage at node 165, transistor 112 is off since its gate is coupled to node 165. Thus, when CLOCK 1 is low and CLOCK 2 is high, transistor 111 is on and transistor 112 is off.

As clock signal CLOCK 1 transitions from high to low, the voltage on capacitor 126 is lowered by $V_{CC}$ volts. This causes the voltage at node 176 to be shifted lower by $V_{CC}$ volts. (It should be noted that this assumes that there is a 100%, or perfect, coupling between the clock signal and the voltage at node 176. With a less than perfect coupling, which is likely the case, the voltage at node 176 would be shifted by less than $V_{CC}$ volts depending on the capacitance of capacitor 126. For ease of explanation, it will be assumed herein that there is perfect coupling by the capacitors in the charge pump circuit 100.) As mentioned above, in one embodiment, $V_{CC}$ is 1.8 volts. Thus, the voltage at node 176 would be lowered by 1.8 volts. Thereafter, when transistor 122 is turned on (through application of a high voltage at node 166 via capacitor 125), negative charge is transferred from node 176 to node 177, thereby in effect transferring negative voltage from node 176 to node 177. The voltage at node 177 is further lowered by lowering the voltage at the capacitor coupled to node 177 as was done with respect to node 176. This capacitor would be capacitor 195 if there are no pumping stages between the second pumping stage 120 and the X-th pumping stage 190. However, if there are one or more pumping stages between the second pumping stage 120 and the X-th pumping stage 190, then the capacitor would be the capacitor in the stage following the second pumping stage 120 coupled to node 177. This process of lowering the voltage from stage to stage continues until the output stage whose output is applied to the OUT node.

Similarly, as clock signal CLOCK 2 transitions from high to low, the voltage on capacitor 125 is lowered by $V_{CC}$ volts. This causes the voltage at node 166 to be shifted lower by $V_{CC}$ volts. (Again, as explained above with respect to the voltage at node 176, we assume here that there is perfect or 100% coupling by capacitor 125. With less than perfect coupling, which is likely the case, the voltage at node 166 would be shifted lower by less than $V_{CC}$ volts.) As mentioned above, in one embodiment, $V_{CC}$ is 1.8 volts. Thus, the voltage at node 166 is lowered by 1.8 volts. Thereafter, when transistor 121 is turned on (through application of a high voltage at node 176 via capacitor 126), negative charge is transferred from node 166 to node 167, thereby in effect transferring negative voltage from node 166 to node 167. The voltage at node 167 is further lowered by lowering the voltage at the capacitor coupled to node 167 as was done with respect to node 166. This capacitor would be capacitor 196 if there are no pumping stages between the second pumping stage 120 and the X-th pumping stage 190. However, if there are one or more pumping stages between the second pumping stage 120 and the X-th pumping stage 190, then the capacitor would be the capacitor in the stage following the second pumping stage 120 coupled to node 167. This process of lowering the voltage from stage to stage continues until the output stage whose output is applied to the OUT node.

The above description explains the lowering of the output voltage via the lower and upper branches of the N-channel charge pump circuit 100. The lower branch of the N-channel charge pump circuit 100 includes node 175, transistor 112, node 176, transistor 122, node 177, node 178, and transistor 192. Additionally, the lower branch includes the connection between each consecutive pair of the above elements. Moreover, it may include transistors and nodes between node 177 and 178 represented by ellipses 150 therebetween. Similarly, the upper branch of the N-channel charge pump circuit 100 includes node 165, transistor 111, node 166, transistor 121, node 167, node 168, and transistor 191. Additionally, the upper branch includes the connection between each consecutive pair of the above elements. Moreover, it may include transistors and nodes between node 167 and 168 represented by ellipses 150 therebetween. The lower and upper branches may also herein be referred to as the lower and upper charge paths, respectively.

As noted above, in one embodiment, when CLOCK 1 transitions from $V_{CC}$ to 0 volts, CLOCK 2 transitions from 0 to $V_{CC}$ volts. Also as noted above, in one embodiment, when CLOCK 1 is at 0 volts, CLOCK 2 is at $V_{CC}$ volts. When CLOCK 2 is at $V_{CC}$ volts, transistors 111 and 122 are on. (Note, as depicted in FIG. 1, when CLOCK 2 is at $V_{CC}$ volts, transistor 191 is also on. As also noted above, when CLOCK 2 is at $V_{CC}$ volts some of the transistors in the stages represented by the ellipses 150 are also on.) During that same period when CLOCK 2 is at $V_{CC}$ volts and CLOCK 1 is at 0 volts, transistors 112 and 121 are off. The transistors are in the opposite state when the states of CLOCK 1 and CLOCK 2 are reversed. As illustrated above, in each pumping stage, when one of the cross coupled transistors is on, the other is off. Thus, while charge is transferred along one of the branches (i.e., the lower or upper branch) of a pumping stage, it is not transferred along the other branch (i.e., the upper or lower branch) of that same pumping stage. Furthermore, when the transistor on the upper branch of any pumping stage M is on, the transistor on the upper branch of the pumping stage M+1 is off, where M is an integer less than X. Similarly, when the transistor on the lower branch of the pumping stage M is on, the transistor on the lower branch of the pumping stage M+1 is off.

Additionally, in one embodiment, in each clock period of CLOCK 1 and CLOCK 2, each pumping stage pumps charge of the same polarity in the same direction twice. For example, in the first pumping stage 110, during the first half of a clock period, e.g., when CLOCK 1 is at $V_{CC}$ volts (and thus CLOCK 2 is at 0 volts), positive charge is pumped from node 176 to node 175, while during the second half of the same clock period, i.e., when CLOCK 1 is at 0 volts (and thus CLOCK 2 is at $V_{CC}$ volts), positive charge is pumped from node 166 to node 165.

As explained in greater detail below, the above relations, between the states of and charge transfer by cross coupled transistors in the same pumping stage and adjacent transistors in pumping stages M and M+1, hold during the early clock cycles. As also explained in greater detail below, in later clock cycles, however, the voltages at the gate and source of cross coupled transistors allow them to turn on prior to applying a high clock signal to the gate. As a result, after sufficient charge transfer by one cross coupled transistor in a stage, the other cross coupled transistor in the same pumping stage turns on prior to applying a high clock signal to its gate.

In the early clock cycles, after charge sharing in the lower branch of a pumping stage (e.g., between nodes 176 and 177) but before turning off the cross coupled transistor in the lower branch (e.g., transistor 122), the gate voltage for the cross coupled transistor in the upper branch of the same pumping stage (e.g., the voltage at node 176) would not be high enough to turn on the cross coupled transistor in the upper branch (e.g., transistor 121.) Similarly, the voltage at source of the cross coupled transistor in the upper branch of the same pumping stage (e.g., the voltage at node 166) would not be low enough to turn on the cross coupled transistor in the upper branch (e.g., transistor 121.)

However, in the later clock cycle, i.e., after the charge pump circuit 100 reaches a stable point (e.g., around 200 $\mu$s in FIG. 2), after charge sharing in the lower branch of a pumping stage (e.g., between nodes 176 and 177) but before turning off the cross coupled transistor in the lower branch (e.g., transistor 122), the gate voltage for the cross coupled transistor in the upper branch of the same pumping stage (e.g., the voltage at node 176) would be high enough to turn on the cross coupled transistor in the upper branch (e.g., transistor 121.) Similarly, the voltage at source of the cross coupled transistor in the upper branch of the same pumping stage (e.g., the voltage at node 166) would be low enough to turn on the cross coupled transistor in the upper branch (e.g., transistor 121.) As a result, the amount of charge leakage in the upper branch of the pumping stage is equal to the amount of charge transfer in the lower branch of the pumping stage. Consequently, where the outputs of the lower and upper branch of a pumping stage are coupled, as is the case in the X-th pumping stage 190, there is no net change in the amount of charge at the output node OUT.

The above charge leakage conditions also apply with respect to charge leakage through the cross coupled transistor of the lower branch after charge transfer through the cross coupled transistor of the upper branch. Similalry, although the second pumping stage 120 is used as an example, the above description also applies to other pumping stages, particularly with respect to the X-th pumping stage 190 which provides an output voltage at the output node OUT.

Figure 2:
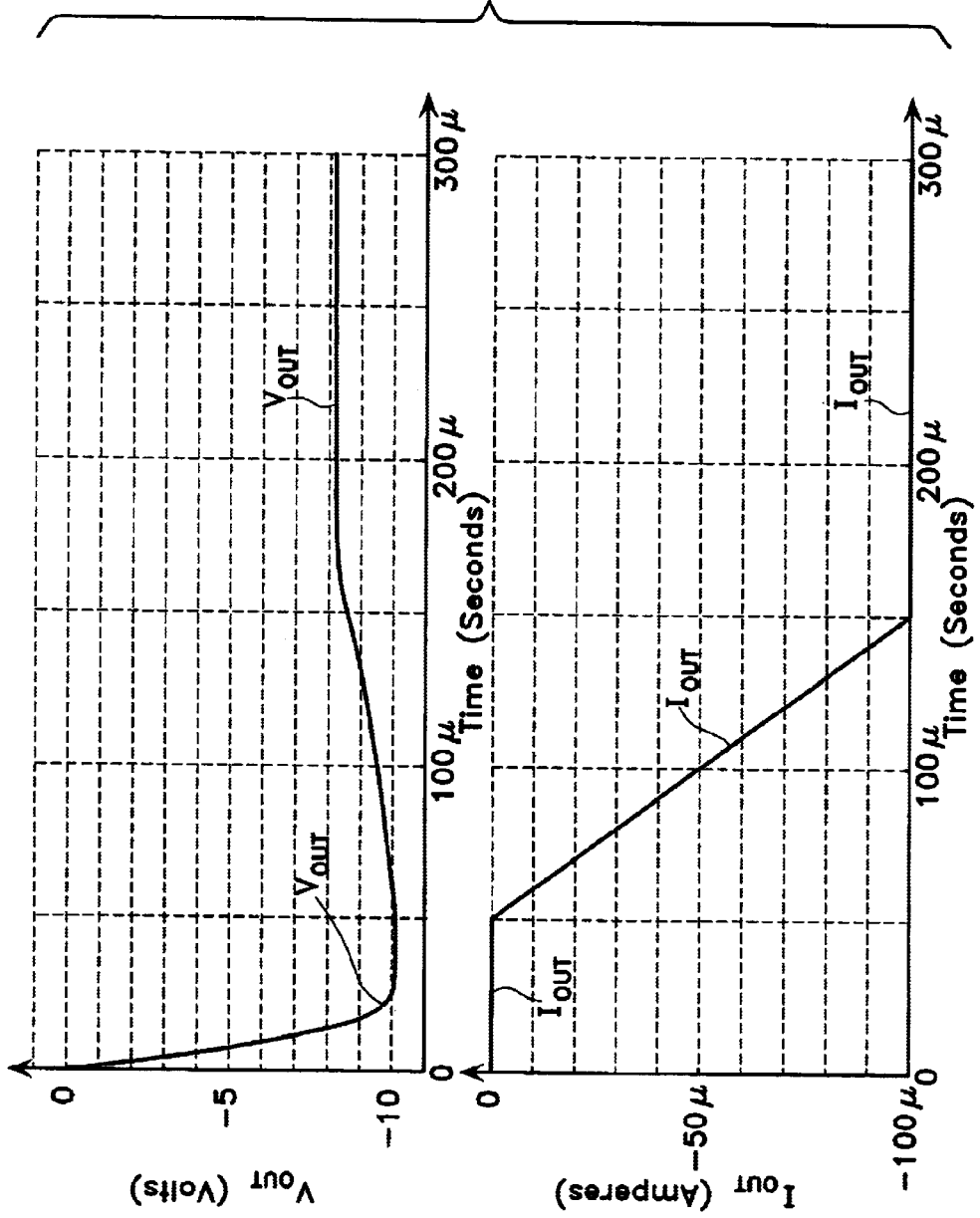
FIG. 2 is a graph of an example of output voltage and current versus time in an embodiment of the present invention.

FIG. 2 is a graph of an example of output voltage and current versus time in an embodiment of the present invention. More specifically, FIG. 2 shows an example of the output voltage $V_{OUT}$ at the OUT node (in FIG. 1) and the output current $I_{OUT}$ through the OUT node (in FIG. 1) versus time for a charge pump circuit of the present invention with ten pumping stages. As can be seen in FIG. 2, $V_{OUT}$ is dropped from 0 volts to approximately −10 volts during the first 50 $\mu$seconds. Thereafter, as current is injected to the node, the voltage $V_{OUT}$ is increased to approximately −8 volts. Also, during the first 50 $\mu$seconds, $I_{OUT}$ is kept at zero amperes. Between 50 $\mu$seconds and 150 $\mu$seconds, $I_{OUT}$ is varied from 0 to −100 $\mu$A microamperes). Thereafter, $I_{OUT}$ is maintained at −100 $\mu$A. At time 237.456 $\mu$seconds, $V_{OUT}$ is equal to −8.13994 volts and $I_{OUT}$ is equal to −100 $\mu$A.

The negative charge pump circuit of the present invention may be used in many systems in which it is desired to provide a relatively large negative voltage. For example, the negative charge pump circuit may be used in a digital system. More specially, the negative charge pump circuit may be used in a digital system comprising a programmable logic device (PLD). Additionally, the negative charge pump circuit may be used in a PLD. As used herein a digital system is not intended to be limited to a purely digital system, but also encompasses hybrid systems that include both digital and analog subsystems. Thus, the present invention encompasses digital systems that include the charge pump circuit described herein.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed is:

1. A charge pump circuit comprising:
   a first pumping stage, wherein the first pumping stage receives a first input voltage and a second input voltage and outputs a first output voltage and a second output voltage, further wherein the first output voltage and the second output voltage are output within one clock cycle; and a second pumping stage coupled to the first pumping stage, wherein the second pumping stage receives the first output voltage and the second output voltage and outputs at least a third output voltage; and at least a third pumping stage coupled to the second pumping stage;

wherein the first pumping stage comprises a first switch and a second switch cross coupled to the first switch, wherein the first switch and the second switch are cross coupled without having transistors disposed therebetween, further wherein charge is delivered via the first switch to the second pumping stage, further wherein the second pumping stage comprises a third switch and a fourth switch cross coupled to the third switch, wherein the third switch and the fourth switch are cross coupled without having transistors disposed therebetween, further wherein charge is delivered via the third switch to the third pumping stage.

2. The charge pump circuit of claim 1, wherein the first pumping stage receives the first input voltage and the second input voltage at a first path input of a first path and a second path input of a second path, respectively, wherein the first path and the second path include the first switch and the second switch, respectively.

3. The charge pump circuit of claim 2, wherein the first switch comprises a first N-channel transistor having a first gate, a first source and a first drain, further wherein said second switch comprises a second N-channel transistor having a second gate, a second source and a second drain, wherein the first source is coupled to the second gate, further wherein the second source is coupled to the first gate.

4. The charge pump circuit of claim 2, wherein charge of one polarity is transferred to the second pumping stage via both the first and second paths in one clock cycle.

5. The charge pump circuit of claim 2, wherein the second pumping stage comprises a third path and a fourth path for delivering charge to the third pumping stage, further wherein the third path and the fourth path include the third switch and the fourth switch, respectively.

6. The charge pump circuit of claim 1 further comprising input nodes coupled to the first pumping stage for receiving the first and second input voltages and an output node coupled to the second pump stage for providing the third output voltage.

7. The charge pump circuit of claim 6, wherein the first and second input voltages are clock signals whose period is equal to the one clock cycle.

8. The charge pump circuit of claim 1, wherein the first and second output voltages are lower than the first and second input voltages.

9. The charge pump circuit of claim 8, further wherein the second pumping stage outputs the third and a fourth output voltage in response to the first and second output voltages, wherein the third and fourth output voltages are lower than the first and second output voltages.

10. A digital system including a programmable logic device and the charge pump circuit of claim 1.

11. A programmable logic device including the charge pump circuit of claim 1.

12. The charge pump circuit of claim 1, wherein charge is delivered via the second switch to the second pumping stage, further wherein charge is delivered via the fourth switch to the third pumping stage.

13. A charge pump circuit comprising:

a first pumping stage comprising a first path and a second path for charge delivery;

a second pumping stage comprising a third path and a fourth path for charge delivery, the second pumping stage coupled to the first pumping stage via the first path and the second path, wherein said second pumping stage receives charge from said first pumping stage via the first path and the second path; and at least a third pumping stage coupled to the second pumping stage via the third path and the fourth path, wherein said third pumping stage receives charge from said second pumping stage via the third path and the fourth path;

wherein said first path comprises a first switch and said second path comprises a second switch crossed coupled to said first switch, wherein the first switch and the second switch are cross coupled without having transistors disposed therebetween, further wherein said third path comprises a third switch and said fourth path comprises a fourth switch crossed coupled to said third switch, wherein the third switch and the fourth switch are cross coupled without having transistors disposed therebetween.

14. The charge pump circuit of claim 13, wherein the first switch comprises a first N-channel transistor having a first gate, a first source and a first drain, further wherein said second switch comprises a second N-channel transistor having a second gate, a second source and a second drain, wherein the first source is coupled to the second gate, further wherein the second source is coupled to the first gate.

15. The charge pump circuit of claim 13, wherein charge of one polarity is transferred from the first pumping stage to the second pumping stage via both the first and second paths in one clock cycle.

16. The charge pump circuit of claim 13 further comprising input nodes coupled to the first pumping stage for receiving first and second input voltages and an output node coupled to the second pumping stage for providing an output voltage.

17. The charge pump circuit of claim 16, wherein the first and second input voltages are clock signals whose period is equal to the one clock cycle.

18. The charge pump circuit of claim 16, wherein the output voltage is lower than the first and second input voltages.

19. A digital system including a programmable logic device and the charge pump circuit of claim 13.

20. A programmable logic device including the charge pump circuit of claim 13.

21. A charge pump circuit comprising:

a first input node and a second input node for receiving first and second input signals, respectively;

X pumping stages, where X is an integer greater than one, and where pumping stages one through X are coupled consecutively in series and pumping stage one is coupled to the first and second input nodes, wherein each of said X pumping stages comprises:

a first switch; and a second switch cross coupled to the first switch, wherein each of said X pumping stages receives a first input voltage at an input of said first switch and pumps a first output voltage at an output of said first switch, further wherein each of said X pumping stages receives a second input voltage at an input of said second switch and pumps a second output voltage at an output of said second switch, wherein said first and second output voltages are pumped within a clock cycle; and an output node coupled to pumping stage X for providing an output voltage;

wherein said first and second switches comprise transistors, further wherein a well in which said transistors in each of said X pumping stages are formed is biased by the output voltage.

22. The charge pump circuit of claim 21, wherein said transistors comprise N-channel transistors.

23. The charge pump circuit of claim 21, wherein each of said first and second input signals is a clock signal having a period equal to said clock cycle.

24. The charge pump circuit of claim 23, wherein said first and second input signals are 180 degrees out of phase with respect to each other.

25. A digital system including a programmable logic device and the charge pump circuit of claim 22.

26. A programmable logic device including the charge pump circuit of claim 21.

27. A method of pumping an output voltage, said method comprising:

first pumping a first output of a first pumping stage from a first input voltage to a first output voltage;

second pumping a second output of the first pumping stage from a second input voltage to a second output voltage; and biasing a well in which pumping transistors in the first pumping stage are formed with the output voltage;

wherein said first pumping and said second pumping occur in one clock cycle.

28. The method of claim 27, wherein each of said first and second input voltages is a clock signal having a period equal to said clock cycle.

29. The method of claim 28, wherein said first and second input voltages are 180 degrees out of phase with respect to each other.

* * * * *